US012108122B2

(12) United States Patent
McClendon et al.

(10) Patent No.: US 12,108,122 B2
(45) Date of Patent: *Oct. 1, 2024

(54) METHOD FOR SERVING INTERACTIVE DIGITAL ADVERTISING CONTENT WITHIN A STREAMING PLATFORM

(71) Applicant: Yieldmo, Inc., Nashua, NH (US)

(72) Inventors: Terry McClendon, Nashua, NH (US); David Sebag, Nashua, NH (US); Sambit Patnaik, Nashua, NH (US)

(73) Assignee: Yieldmo, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,509

(22) Filed: Mar. 30, 2023

(65) Prior Publication Data

US 2023/0239545 A1 Jul. 27, 2023

Related U.S. Application Data

(63) Continuation of application No. 17/566,948, filed on Dec. 31, 2021, now Pat. No. 11,647,259, which is a (Continued)

(51) Int. Cl.
*H04N 21/81* (2011.01)
*G06F 3/04817* (2022.01)
(Continued)

(52) U.S. Cl.
CPC ....... *H04N 21/812* (2013.01); *G06F 3/04817* (2013.01); *H04N 21/23424* (2013.01); *H04N 21/234345* (2013.01)

(58) Field of Classification Search
CPC .......... H04N 21/812; H04N 21/23424; H04N 21/234345; G06F 3/04817
See application file for complete search history.

(56) References Cited

U.S. PATENT DOCUMENTS 6,708,208 B1 3/2004 Philyaw
9,066,122 B1 * 6/2015 Rattazzi ........... H04N 21/44204
(Continued)

OTHER PUBLICATIONS

Non-Final Office Action for U.S. Appl. No. 17/852,125 dated Mar. 7, 2023.

*Primary Examiner* — Timothy R Newlin
(74) *Attorney, Agent, or Firm* — Run8 Patent Group, LLC; Peter Miller; Leah Raddatz

(57) ABSTRACT

One variation of a method includes: rendering a home screen of an ad stream viewed on a display of a streaming device accessed by a user, the home screen including an image player located in a first subregion of the home screen and a set of icons selectable by the user, each icon corresponding to a video advertisement loaded within the image player; in response to detecting a first user input proximal a first icon, reconfiguring the image player to a second subregion of the home screen and triggering playback of a first video advertisement within the image player; and, during playback of the first video advertisement, in response to receiving a second user input proximal the first icon, reconfiguring the image player to a third subregion of the home screen, activating an audio stream corresponding to the first video advertisement, and continuing playback of the first video advertisement.

10 Claims, 4 Drawing Sheets

Related U.S. Application Data continuation-in-part of application No. 17/349,570, filed on Jun. 16, 2021, now Pat. No. 11,405,667.

(60) Provisional application No. 63/289,995, filed on Dec. 15, 2021, provisional application No. 63/040,447, filed on Jun. 17, 2020.

(51) Int. Cl.
*H04N 21/234* (2011.01)
*H04N 21/2343* (2011.01)

(56) References Cited

U.S. PATENT DOCUMENTS

| | | | |
|---|---|---|---|
| 9,154,722 B1* | 10/2015 | Muniyandi | H04N 5/76 |
| 9,167,312 B2* | 10/2015 | Archer | H04N 21/812 |
| 9,301,022 B1* | 3/2016 | Rowles | H04N 21/4722 |
| 10,026,104 B2* | 7/2018 | Huang | H04N 21/4782 |
| 10,180,982 B2* | 1/2019 | Maharajh | G06Q 30/0277 |
| 2002/0100041 A1* | 7/2002 | Rosenberg | H04N 9/8227 |
| | | | 348/E7.063 |
| 2002/0174430 A1* | 11/2002 | Ellis | H04N 21/4753 |
| | | | 386/230 |
| 2003/0110499 A1* | 6/2003 | Knudson | H04N 7/17318 |
| | | | 348/E7.071 |
| 2007/0162951 A1* | 7/2007 | Rashkovskiy | H04N 21/8166 |
| | | | 348/E7.071 |
| 2007/0300263 A1* | 12/2007 | Barton | H04N 21/4532 |
| | | | 725/24 |
| 2008/0127247 A1 | 5/2008 | Allen et al. | |
| 2008/0263583 A1* | 10/2008 | Heath | G06Q 30/0273 |
| | | | 705/14.69 |
| 2008/0297591 A1* | 12/2008 | Aarts | H05B 47/155 |
| | | | 348/E13.001 |
| 2009/0094635 A1 | 4/2009 | Aslin et al. | |
| 2010/0083304 A1* | 4/2010 | Pan | H04N 21/441 |
| | | | 348/734 |
| 2011/0145856 A1* | 6/2011 | Agarwal | H04N 21/6581 |
| | | | 725/32 |
| 2011/0231868 A1 | 9/2011 | Martens | |
| 2012/0051252 A1* | 3/2012 | Iwao | H04L 45/18 |
| | | | 370/252 |
| 2012/0099022 A1* | 4/2012 | Sundy | H04N 21/812 |
| | | | 348/E5.057 |
| 2012/0110616 A1 | 5/2012 | Kilar et al. | |
| 2013/0014153 A1* | 1/2013 | Bhatia | H04H 60/31 |
| | | | 725/24 |
| 2013/0086607 A1* | 4/2013 | Tom | H04N 21/8153 |
| | | | 725/32 |
| 2013/0132211 A1 | 5/2013 | Tsai et al. | |
| 2013/0144720 A1* | 6/2013 | Hari | G06Q 30/0241 |
| | | | 705/14.55 |
| 2013/0159107 A1* | 6/2013 | Lim | H04N 21/237 |
| | | | 705/14.55 |
| 2013/0347032 A1* | 12/2013 | Geraci | H04N 21/47815 |
| | | | 725/34 |
| 2014/0089956 A1 | 3/2014 | Shah et al. | |
| 2014/0139742 A1 | 5/2014 | Krishna et al. | |
| 2014/0150019 A1* | 5/2014 | Ma | H04N 21/458 |
| | | | 725/34 |
| 2014/0372229 A1 | 12/2014 | Huang et al. | |
| 2015/0019983 A1* | 1/2015 | White | G06F 3/04815 |
| | | | 715/739 |
| 2015/0113560 A1* | 4/2015 | McCoy | H04N 21/6125 |
| | | | 725/32 |
| 2015/0150042 A1* | 5/2015 | Hwang | H04N 21/6587 |
| | | | 725/32 |
| 2016/0225012 A1* | 8/2016 | Ha | G06Q 30/0277 |
| 2016/0267879 A1* | 9/2016 | Champel | G06F 40/143 |
| 2016/0345076 A1* | 11/2016 | Makhlouf | G06Q 30/02 |
| 2017/0208348 A1* | 7/2017 | Cheng | H04N 21/84 |
| 2017/0272824 A1* | 9/2017 | Bunner | H04W 76/14 |
| 2017/0289642 A1* | 10/2017 | Bury | G06F 16/9535 |
| 2018/0184169 A1* | 6/2018 | Maughan | H04N 21/4667 |
| 2019/0082239 A1* | 3/2019 | Webster | H04H 20/38 |
| 2020/0045358 A1* | 2/2020 | Modi | H04L 65/611 |
| 2020/0099977 A1* | 3/2020 | Korn | H04N 21/4331 |
| 2021/0127160 A1* | 4/2021 | Abe | G06F 13/00 |
| 2021/0321160 A1 | 10/2021 | Cormie et al. | |

\* cited by examiner

METHOD FOR SERVING INTERACTIVE DIGITAL ADVERTISING CONTENT WITHIN A STREAMING PLATFORM

CROSS-REFERENCE TO RELATED APPLICATIONS

This Application is a continuation application of U.S. patent application Ser. No. 17/566,948, filed on 31 Dec. 2021, which claims the benefit of U.S. Provisional Application No. 63/289,995, filed on 15 Dec. 2021, and is a Continuation-in-Part of U.S. patent application Ser. No. 17/349,570, filed on 16 Jun. 2021, which claims the benefit of U.S. Provisional Application No. 63/040,447, filed on 17 Jun. 2020, each of which is incorporated in its entirety by this reference.

TECHNICAL FIELD

This invention relates generally to the field of digital advertising and more specifically to a new and useful method for serving interactive content in the field of digital advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
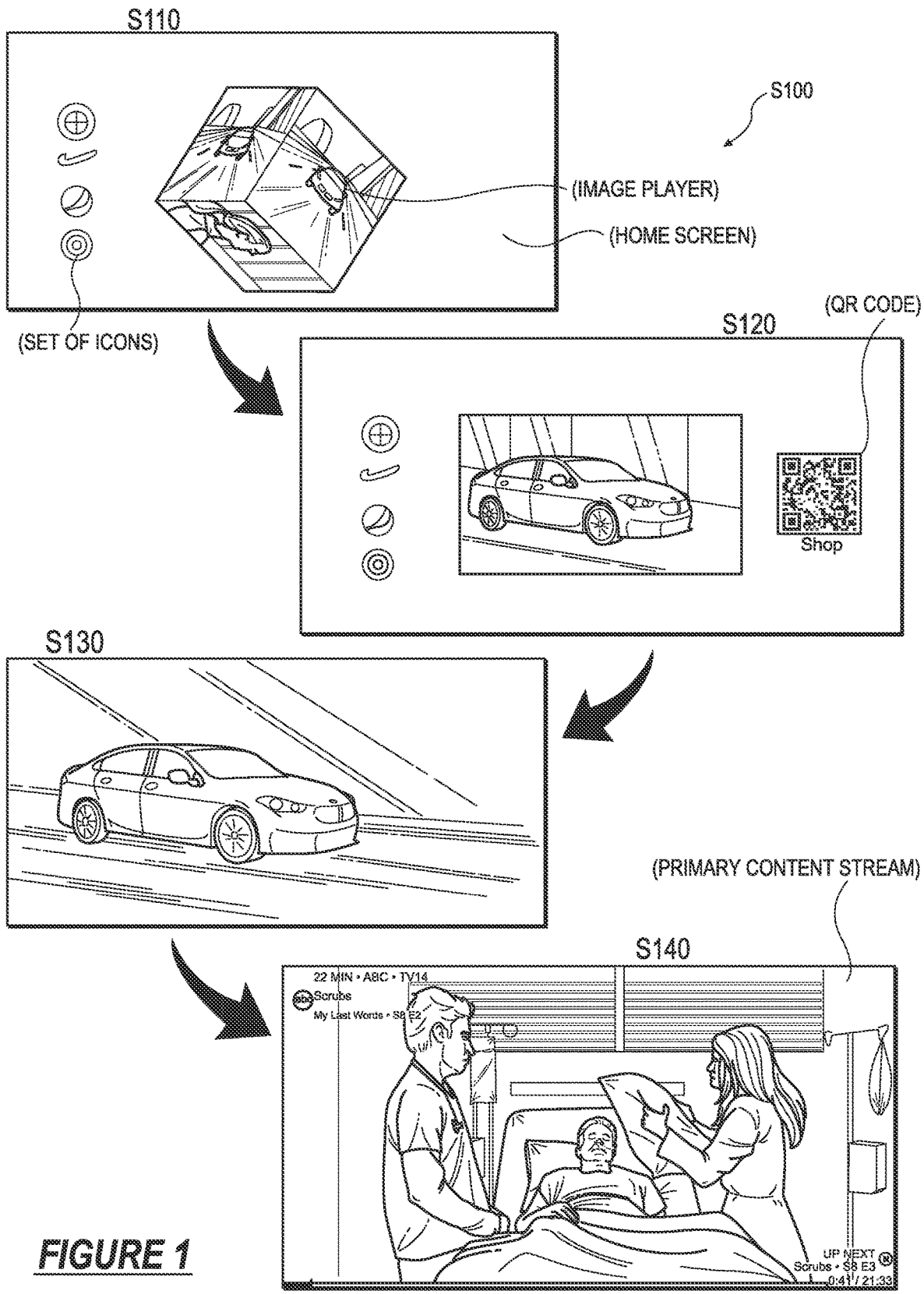
FIG. 1 is a flowchart representation of a method.
Figure 2:
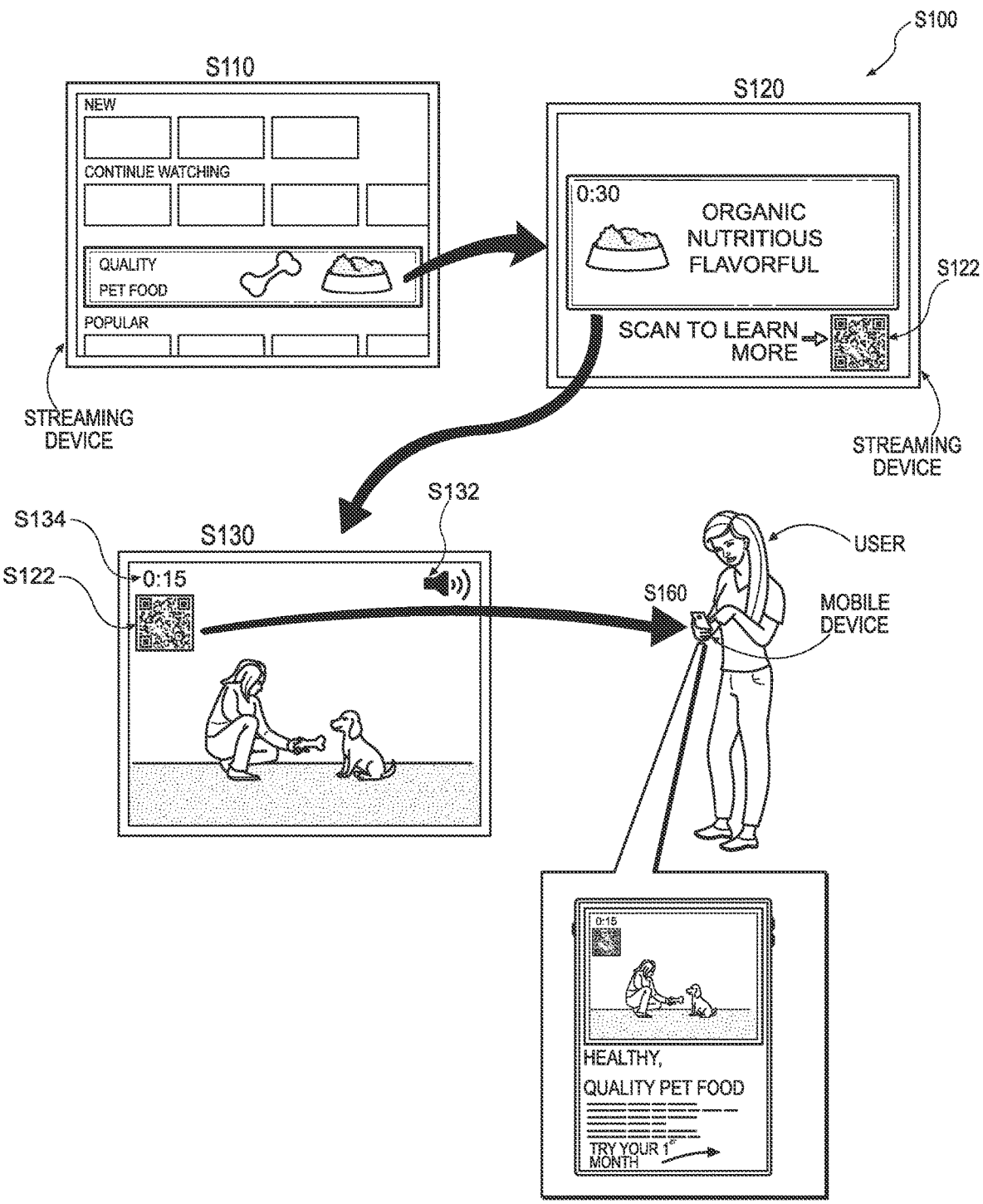
FIG. 2 is a flowchart representation of the method.
Figure 3:
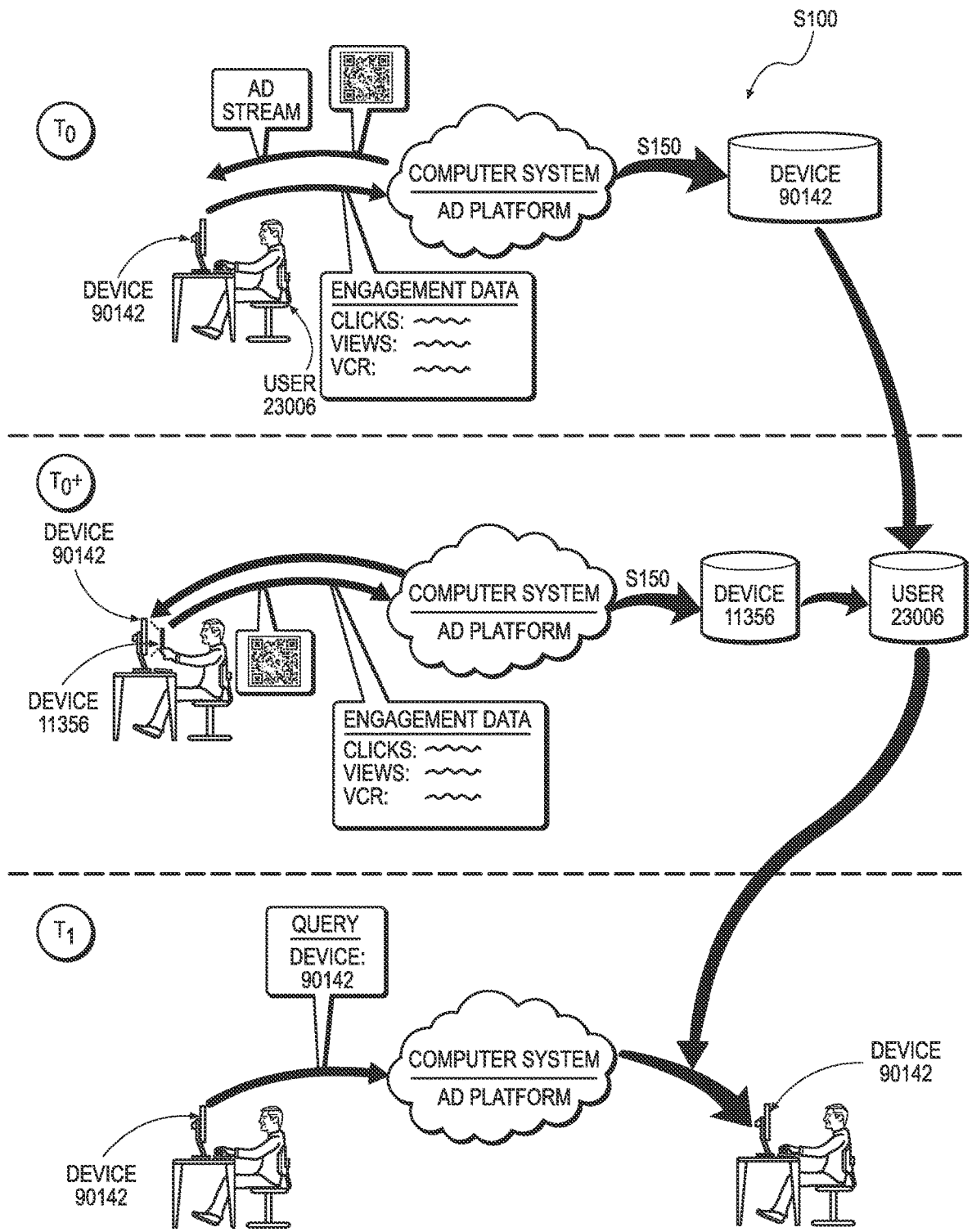
FIG. 3 is a flowchart representation of the method.
Figure 4:
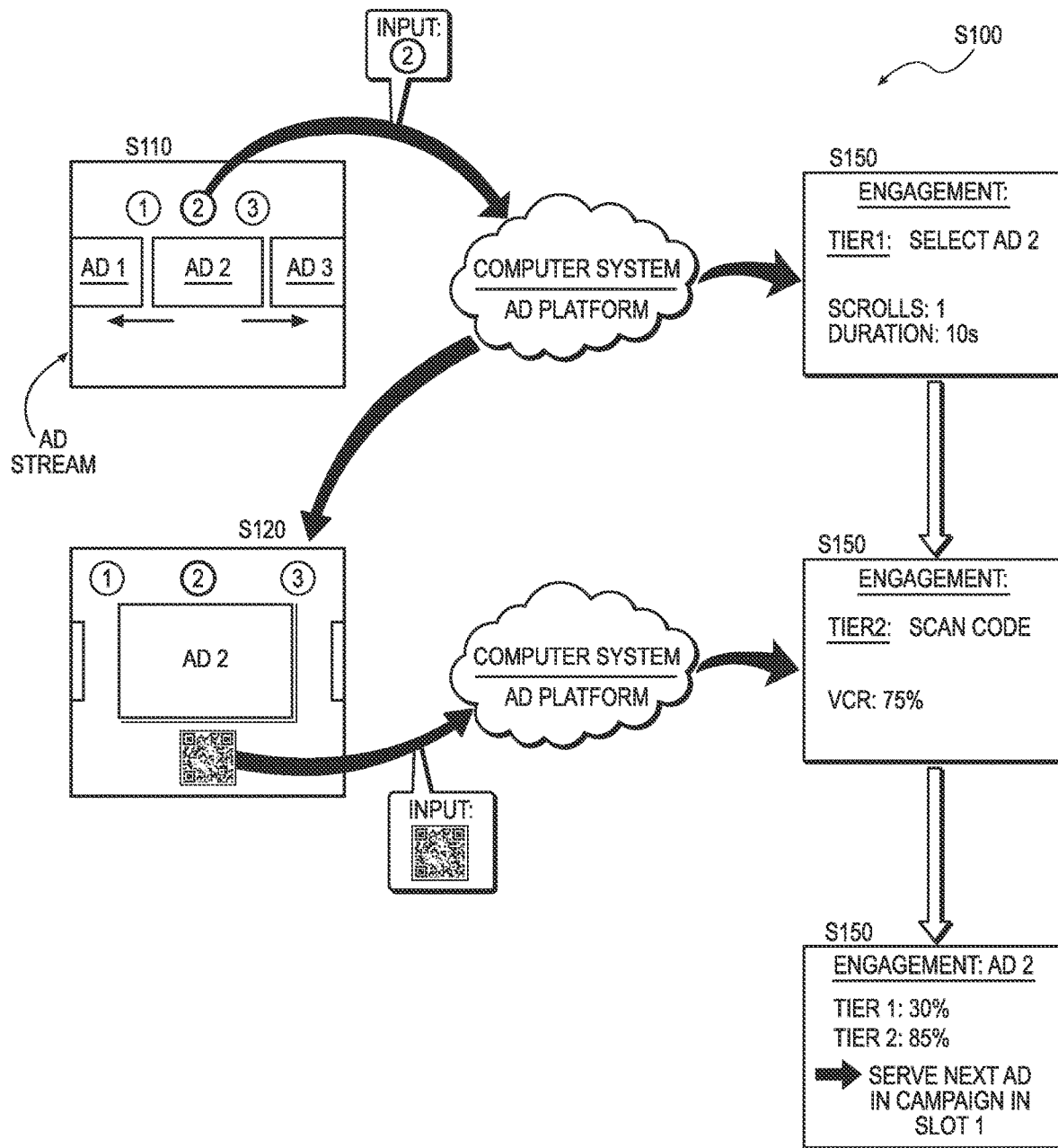
FIG. 4 is a flowchart representation of the method.

As shown in FIGS. 1-4, a method S100 includes: rendering a home screen of an ad stream viewed on a display of a streaming device accessed by a user, the home screen comprising an image player located in a first subregion, in a set of subregions, of the home screen and a set of icons selectable by the user, each icon, in the set of icons, corresponding to a video advertisement, in a set of video advertisements, loaded within the image player in Block Silo; and, in response to detecting a first user input proximal a first icon in the set of icons, reconfiguring the image player to a second subregion of the home screen and triggering playback of a first video advertisement, in the set of video advertisements, corresponding to the first icon, within the image player in Block S120. The method S100 further includes, during playback of the first video advertisement within the image player, located in the second subregion of the home screen, in response to receiving a second user input proximal the first icon: reconfiguring the image player to a third subregion of the home screen in Block S130; activating a first audio stream corresponding to playback of the first video advertisement in Block S132; and continuing playback of the first video advertisement in Block S134.

One variation of the method S100 further includes, rendering a QR code adjacent the image player within the home screen, the QR code linked to the ad stream in Block S122; and, in response to the user capturing the QR code at a secondary device (e.g., a mobile device) accessed by the user during playback of the first video advertisement, triggering the secondary device to navigate to advertising content (e.g., on a webpage, within a native application) associated with the first video advertisement on a web browser executing on the secondary device in Block S160.

One variation of the method S100 further includes characterizing engagement of the user with advertising content rendered within the ad stream based on user interactions with the image player in Block S150.

One variation of the method S100 includes: during a first pause event that pauses playback of a primary content stream at a first frame of a digital video in the primary content stream, the primary content stream viewed on a display of a streaming device accessed by a user: rendering a home screen of an ad stream in replacement of the primary content stream, the home screen including an image player located in a first subregion, in a set of subregions, of the home screen and including a set of icons selectable by the user, each icon, in the set of icons, corresponding to a video advertisement, in a set of video advertisements; and, in response to detecting a first user input proximal a first icon, in the set of icons, reconfiguring the image player to a second subregion of the home screen and initiating playback of a first advertisement, in the set of video advertisements, linked to the first icon, from a first frame in the first video advertisement to a second frame succeeding the first frame within the image player. In this variation, the method S100 further includes, in response to detecting a second user input proximal the first icon: expanding the image player across the home screen; activating an audio stream of the first video advertisement; and continuing playback of the first video advertisement from the second frame to a third frame succeeding the second frame in the first video advertisement within the image player.

In one variation, the method S100 includes, during a first pause event that pauses playback of a primary content stream—viewed on a display of a streaming device (e.g., television, computer, mobile phone) associated with a user—at a first frame in a digital video in the primary content stream: overlaying the first frame of the primary content stream with a home screen of an ad stream in Block S110, the home screen including an image player in a first subregion of the home screen, defining a responsive transformation, and including a set of icons selectable by the user and linked to a set of video advertisements. In this variation, the method also includes, in response to detecting a first user input proximal a first icon, in the set of icons, corresponding to a first video advertisement in the set of video advertisements: reconfiguring the image player to a second subregion of the home screen according to the responsive transformation; and initiating playback of a first segment of the first video advertisement from a first frame in the first video advertisement to a second frame succeeding the first frame within the image player in Block S120.

In this variation, the method S100 further includes, in response to detecting a second user input proximal the first icon: expanding the image player across the home screen; activating an audio stream of the first video advertisement; and continuing playback of the first video advertisement from the second frame to a third frame succeeding the second frame in the first video advertisement within the image player in Block S130. In this variation, the method S100 further includes, in response to a user input that resumes playback of the primary content stream: pausing playback of the first video advertisement; rendering the first frame in the digital video of the primary content stream in replacement of the ad stream; terminating the first pause event; and resuming playback of the digital video in the primary content stream in Block S140.

In one variation, the method S100 further includes, during a second pause event that pauses playback of the primary content stream at a second frame in the digital video succeeding the first frame: overlaying the first frame of the primary content stream with the home screen of the ad stream, the image player in the second subregion; initiate playback of a second segment of the first video advertisement from the third frame of the video advertisement to a fourth frame in the video advertisement; and, in response to detecting a third user input proximal the first icon, expanding the image player across the home screen; activating the audio stream of the first video advertisement; and continuing playback of the first video advertisement from the fourth frame to a fifth frame succeeding the fourth frame in the first video advertisement within the image player.

In one variation, the method S100 further includes: during the first pause event, rendering a QR code adjacent the second subregion within the home screen, the QR code linked to the ad stream; and, in response to the user capturing the QR code at a mobile device associated with the user, continuing playback of the first video advertisement from the second frame in the first video advertisement at the mobile device in Block S160.

2. Applications

Generally, the method S100 can be executed by an advertising (or "ad") platform: to serve an interactive ad stream to a user—viewing a primary video streaming content (e.g., videos, a television show, a movie) on a streaming device (e.g., Smart TV, computing device, mobile phone)—while this primary video streaming content is paused and/or inactive; and to selectively increase screen area allocated to an ad within the interactive ad stream and selectively activate an audio stream for the ad responsive to passive and active user inputs.

In particular, the method S100 can be executed by an ad platform (and/or an ad tech vendor, a publisher, an ad agency, or an online social networking platform, etc.)—in combination with a video streaming platform (e.g., an ad-supported streaming service)—to: render an ad stream responsive to pauses or breaks in the primary content stream initiated by the user; present the user with a selection of video advertisements in an interactive (and motive) format; and tailor ad content served to the user based on the user's selection of video advertisements within the ad stream.

For example, during a pause event in the primary content stream, the ad platform and video streaming platform can: render a home screen of an ad stream over the paused primary content stream; concurrently render multiple distinct, silent video advertisements within small, moving tiles (e.g., over facets of a rotating cube) and corresponding icons within the ad home screen; expand a first video advertisement within the set to a large region of the home screen when a cursor is moved near a corresponding icon or near the corresponding tile; and then expand the first video advertisement to fill the home screen and activate an audio stream for the first video advertisement when the corresponding icon or the first advertisement itself is selected. The ad platform and video streaming platform can then store a stop time of the first video advertisement, close the ad home screen, and resume playback of the primary content stream responsive to a "play" input from the user. The ad platform and video streaming platform can also: resume silent playback of the first ad from the stored stop time—within the ad home screen overlayed on the primary content stream—responsive to a subsequent pause event at the primary content stream; and reactivate the audio stream of the first ad responsive to further input from the user.

Therefore, the ad platform—in combination with the streaming platform—can serve the user an interactive ad stream (hereinafter "ad stream") during events (or "pause events") initiated by the user. By serving the ad stream to the user during user-initiated events (e.g., during pauses or breaks in playback of the primary content stream)—rather than at regular scheduled intervals throughout the primary content stream—the ad platform can minimize inconvenience to the user and increase a likelihood of higher user engagement with ad content viewed during an ad stream. For example, if a user and her roommate are streaming a TV show together, and her roommate needs to take their dog outside, the user may pause the TV show (or "primary content stream") and the ad platform can render the ad stream in replacement of the primary content stream. The user may be more likely to engage with video advertisements presented to her during this ad stream (e.g., while her roommate is outside with their dog) than she would during a regularly scheduled video advertisement interrupting the primary content stream while her roommate is still watching with her.

Therefore, the ad platform can cooperate with a streaming platform to serve to a user video advertisements tailored to the user's interests, thus increasing the likelihood of achieving a target outcome (e.g., brand lift, conversion, video completion) associated with the video advertisements. Further, by enabling the user to control playback of video advertisements (e.g., when video advertisements are played, duration of video advertisements, content of video advertisements), the ad platform can increase likelihood that the user will engage with advertising content and minimize frustration experienced by the user due to video advertisements interrupting the primary content stream.

In one implementation, for each advertisement (e.g., video advertisement) shown to the user during a particular pause event, the image player can: present a global theme—such as represented by a static image or video clip—or title associated with the video advertisement within the image player at a first tier, such as prior to any engagement or selection by the user; present an expanded view of the video advertisement in a second tier responsive to a first user input entered by the user and indicating selection of the video advertisement; present a further expanded view of the video advertisement in combination with playback of a corresponding audio stream in a third tier responsive to a second user input entered by the user and indicating further selection of the video advertisement; and/or present the user with additional advertising content—outside of the streaming platform (e.g., in a web browser executing on the user's streaming device or a secondary device)—related to the video advertisement in a fourth tier, such as a webpage associated with a particular brand, a webpage for purchasing content advertised in the video advertisement, and/or an extended version of the video advertisement, responsive to the user engaging with a QR code (e.g., capturing the QR code with her mobile device), a hyperlink, or another type of advertisement identifier rendered in the ad stream proximal the video advertisement.

Therefore, by sequentially increasing access to advertising content in multiple "tiers" relating to the video advertisement, the image player can enable a user viewing the image player to quickly visually access the global theme (the first tier), engage with a particular subtheme within the global theme (i.e., the "second tier"), increase engagement with the particular subtheme and/or access additional details related to the particular subtheme (i.e., the "third tier"), and then access complete, original content relating to the particular theme (i.e., the "fourth tier").

Furthermore, by supplying branded content to the user through multiple tiers, the image player (and/or the ad platform, etc.) can also characterize the user's engagement with this branded content at an increased resolution. For example, the image player can characterize the user's engagement with this content based on global interactions with the image player and local interactions with the video advertisements and expanded versions of the video advertisement, such as whether the user initially selects a particular video advertisement, expands a particular video advertisement, initiates an audio feed corresponding to a particular video advertisement, scans a QR code associated with a particular video advertisement, and/or views a webpage linked to a particular video advertisement via the QR code, etc. and generates an engagement metric for the user accordingly.

3. Example: User Experience

The ad platform—in combination with a streaming platform—can serve an interactive ad stream during an event (e.g., a "pause" event) initiated by the user while viewing streaming content on a streaming device. For example, a user may enter a selection (e.g., via her TV remote control) of streaming content (e.g., a television show, a movie, a video short) to watch on her television via a streaming platform (e.g., an ad-supported streaming service). In response to receiving her selection, the streaming platform can initiate playback of a video stream corresponding to the user's selection (hereinafter a "primary content stream"). Later, while viewing the selected primary content stream, the user may pause playback of the primary content stream. This "pause" event, initiated by the user, triggers the ad platform to serve to the user an ad stream in replacement of the primary content stream.

During the pause event, the ad platform can render a home screen of the ad stream configured to present the user with a set of video advertisements from which the user may select a video advertisement for viewing. The home screen can include: an image player configured to render playback of the set of video advertisements and defining a responsive transformation; and a set of icons, each icon corresponding to a video advertisement in the set of video advertisements. At the home screen, the user may manipulate a pointer (e.g., cursor, television remote) to preview, select, and/or view a particular video advertisement, in the set of video advertisements, by interacting with the set of icons.

At a first pause level of the pause event, triggered by initiation of the pause event, the ad platform can present the image player at a first subregion of the home screen. The image player can be configured to concurrently render a set of video advertisements, each distinct video advertisement in the set of video advertisements rendered within a tile of the image player. At the first pause level, the ad platform renders these video advertisements within the image player without audio. By initially presenting these video advertisements without audio, the ad platform can accommodate users who may have paused the primary content stream to take a phone call or converse with other viewers. Therefore, in order to increase the user's interest in these silent video advertisements, presented concurrently within the image player, the ad platform can animate the tiles (e.g., over facets of a rotating cube) to present moving video advertisements to the user in order to draw the user's attention and prompt an interaction and/or selection of a video advertisement. Further, by presenting multiple video advertisements concurrently within the image player, and therefore at low resolution, the ad platform can entice the user to further interact with or select a video advertisement for viewing at a higher resolution.

In this example, the user may be enticed by a first video advertisement rendered within a first tile of the image player. To preview the first video advertisement, the user may hover her cursor over a first icon, in the set of icons, corresponding to the first video advertisement. (Alternatively, for another user viewing on his mobile device, the user may tap on the first icon). In response to the user hovering her cursor over the first icon, the ad platform can detect a first user input proximal the first icon.

At a second pause level of the pause event, triggered by the first user input proximal the first icon, the ad platform can reconfigure the image player from the first subregion to a second subregion of the home screen. The ad platform can reconfigure (e.g., modify shape, size, and/or placement of) the image player to render the first video advertisement within an expanded window. At the second pause level, the image player renders only the first (or selected) video advertisement within the image player. The ad platform can initiate playback of the first video advertisement within the image player. In addition, the ad platform can render the set of icons adjacent the image player, such that the user may elect to switch to a different video advertisement during playback of the first video advertisement. Therefore, at the second pause level, the ad platform enables the user to preview the first video advertisement at a higher resolution than at the first pause level, while enabling the user to switch to a different video advertisement if the user is not actually interested in the first video advertisement. Thus, the ad platform can verify the user's interest in the first video advertisement and enable the user to search for a video advertisement that the user finds most interesting.

However, if the user wishes to continue viewing the first video advertisement, then the user may locate her cursor over the first icon and click. (Alternatively, for another user viewing on his mobile device, the user may enter a second tap on the first icon). In response to the user clicking on the first icon, the ad platform can detect a second user input proximal the first icon.

Finally, at a third pause level of the pause event, triggered by the second user input proximal the first icon, the ad platform can expand the image player across the home screen (e.g., without the set if icons). Additionally and/or alternatively, the ad platform can automatically expand the image player across the home screen response to the user viewing the first video advertisement at the second pause level for more than a threshold duration. At the third pause level, the ad platform can activate an audio stream of the first video advertisement and continue playback of the first video advertisement within the image player such that the user may view the complete first video advertisement.

While viewing playback of the first video advertisement on her streaming device, the user may: continue viewing (full-screen) playback of the first video advertisement; exit playback of the first video advertisement to return to the home screen of the ad stream; and/or exit the ad stream and return to playback of the primary content stream.

Within the ad stream, the image player can render a QR code corresponding to the ad stream on the display of the user's streaming device. The user may capture an image of the QR code with a camera built into her mobile device to access the ad stream on her mobile device. Thus, if the user wishes to resume playback of the primary content stream but also finish viewing the first video advertisement or learn more about content within the first video advertisement, the user may scan the QR code with the camera on her mobile device, press "play" on her TV remote control to resume playback of the primary content stream, and continue playback of the first video advertisement on her mobile device. Similarly, the ad platform can render additional icons (e.g., QR codes, images, links) on the display of the streaming device within the ad stream configured to link the user to content (a webpage associated with a product advertised, a webpage corresponding to a brand) related to video advertisements viewed by the user within the ad stream.

Later, in response to a second pause event initiated by the user during the primary content stream, the ad platform can automatically load a last frame of the first video advertisement viewed by the user and continue playback of the first video advertisement from this frame at the second pause level. However, if the user completed playback of the first video advertisement during the first pause event, then the ad platform can automatically select a second video advertisement to serve to the user that is related to the first video advertisement, such as a continuation of a plotline presented in the first video advertisement. Alternatively, the ad platform can render the home screen (e.g., at the first pause level) at the start of each pause event and enable the user to select a new video advertisement or continue playback of a previously viewed video advertisement.

3. Interactive Ad Stream

During a first pause event, initiated by the user, the ad platform can serve an ad stream to the user in replacement of the primary content stream. More specifically, in response to initiation of the pause event, the ad platform can render a home screen of the ad stream configured to enable the user to navigate the ad stream, interact with advertising content, and select video advertisements within the ad stream for viewing. The home screen can include an image player configured to present advertising content to the user and a set of icons (e.g., controls) configured to receive user inputs (e.g., selections) of advertising content.

The home screen can include an image player configured to render and/or play video advertisements available to the user within the ad stream. The image player can be configured to render frames or playback of a single video advertisement or of multiple video advertisements simultaneously and to transform (e.g., in shape, size, orientation, color) video advertisements in different formats responsive to user inputs. More specifically, the ad platform can reconfigure the image player to different subregions of the home screen responsive to user inputs at the home screen, such as by reconfiguring the shape, size, and/or location of the image player within the home screen.

The home screen can include a set of icons configured to receive user inputs, each icon corresponding to a video advertisement in a set of video advertisements available to the user within the ad stream. The user may enter an input or "select" an icon by locating a pointer (e.g., moving a cursor on the display, toggling the pointer via remote control) on or over the icon. Each icon in the set of icons can be configured to trigger playback of the video advertisement corresponding to each icon responsive to receiving a user input. Further, each icon can be configured to generate feedback (e.g., a sound, an animation) to the user responsive to a user input on or over the icon, such as generating a sound and/or transforming according to a responsive animation (e.g., expand in size, change color, increase opacity) defined by each icon.

In one implementation, each icon can be configured to receive multiple types of user inputs and trigger a response according to the type of user input. For example, the ad platform can render the home screen including a set of icons (e.g., four icons), each icon corresponding to a particular video advertisement. Responsive to the user locating her pointer on or over a first icon corresponding to a first video advertisement, the ad platform can expand a size and increase a brightness of the first icon according to a responsive animation defined by the set of icons. Simultaneously, in response to the user locating her pointer over the first icon, the ad platform can trigger the image player to initiate playback of the first video advertisement, the image player defining a rectangular frame, frames of the first video advertisement configured to match a size of the rectangular frame. Then, in response to the user clicking on the first icon, the ad platform can: generate a sound indicating confirmation of the "click" over the first icon; trigger the image player to continue playback of the first video ad; and expand the image player across the home screen (e.g., to full-screen view).

In one implementation, the ad platform renders the home screen over a paused frame of the primary content stream. The home screen includes the image player configured to render advertising content (e.g., static images, video) and the set of icons configured to receive user inputs, and can define a background layer. In this implementation, the background layer can define an opacity level (e.g., 50 percent, 75 percent) such that the paused frame of the primary content stream is viewable through the background layer.

3.1 Tiered Content

The ad platform can be configured to advance through a tiered hierarchy of advertising content for each video advertisement loaded in the image player as the user engages further with advertising content in the image player. In particular, the ad platform can advance through a sequence of image player configurations, expanded windows, and/or external webpages and/or applications to serve advertising content to the user in decreasing levels of abstraction as the user increases engagement with this advertising content.

For example, the ad platform can render a home screen of an ad stream including: a set of video advertisements into an image player configured to render playback of the set of video advertisements and defining a sequence of transformations; and a set of icons, each icon, in the set of icons, linked to a particular video advertisement, in the set of video advertisements, and configured to receive user inputs. The set of icons can be overlaid the set of video advertisements—such as defining a layer over a particular video advertisement—and/or arranged proximal the set of video advertisements in the image player. In this example, in response to a pause event initiated by the user, the ad platform can initially: render the image player in a first configuration (e.g., a cube, a rotating carousel, an image frame or banner) and located in a first subregion of the home screen.

In particular, for each video advertisement, in the set of video advertisements, the ad platform can: initially render a static image (e.g., a first frame of the video advertisement, a brand name and/or logo associated with the video advertisement, a static advertisement related to the video advertisement) within a particular advertisement slot (e.g., a face of a 3D cube, a position within a rotating carousel), in a set of advertisement slots, defined by the image player in the first configuration. Alternatively, the ad platform can render a short clip of the video advertisement and/or playback of the video advertisement with frames of the video advertisement spanning a fraction of the first subregion. Then, in response to a first user input proximal an icon (e.g., overlaid the particular advertisement slot, adjacent the set of video advertisements), in the set of icons, associated with the video advertisement, the ad platform can: reconfigure the image player to a second configuration (e.g., a single frame) in a second subregion of the home screen; and initiate playback of the video advertisement, such that frames of the video advertisement span the second subregion, thereby decreasing a level of abstraction of advertising content presented in the video advertisement responsive to initial user engagement with the video advertisement, by increasing a portion of the home screen occupied by the video advertisement and simultaneously initiating playback of the video advertisement.

Then, in response to a second user input proximal the icon and/or video advertisement, the ad platform can: reconfigure the image player to a third configuration (e.g., an expanded single frame) in a third subregion of the home screen spanning a greater portion of the home screen than the second subregion; and initiate an audio stream corresponding to the video advertisement; continue playback of the video advertisement with frames of the video advertisement spanning the third subregion, thereby again decreasing a level of abstraction of advertising content presented in the video advertisement responsive to further user engagement with the video advertisement, by further increasing a portion of the home screen occupied by the video advertisement and simultaneously initiating playback of the audio stream. Finally, in response to the user capturing the QR code rendered on the home screen with her mobile device, the ad platform can: trigger navigation—on a web browser executing on the user's mobile device—to a webpage or a particular section of the webpage corresponding to the video advertisement.

The ad platform and/or image player can therefore enable the user viewing the ad stream to engage with and view advertising content at a level of abstraction proportional to the user's interest level in content rendered within the image player and/or additional advertising content related to these video advertisements. Thus, the ad platform and/or image player can render information relevant to the user advertisement to avoid presenting the user with content that may not interest the user, while enabling the user to selectively consume advertising content at incrementally-increased resolution.

3.1.2 Image Player Configuration

In one implementation, the ad platform can render an image player, located in a first subregion of the home screen, defining a banner of video advertisements arranged in a row or column. For example, the ad stream can be integrated within a home page of the streaming platform, such as adjacent a selection of media (e.g., films, television shows, sporting events) available to the user via the streaming platform. In this example, the ad stream can render the image player—defining a set of advertisement slots arranged in a row (e.g., a horizontal row), each advertisement slot, in the set of advertisement slots, loaded with a video advertisement, in a set of video advertisements loaded at the image player. In particular, the image player can define: a first advertisement slot, in the set of advertisement slots, loaded with a first video advertisement, in the set of video advertisements; a second advertisement slot, in the set of advertisement slots, loaded with a second video advertisement, in the set of video advertisements; and a third advertisement slot, in the set of advertisement slots, loaded with a third video advertisement, in the set of video advertisements.

The ad stream can further include a set of icons defining a set of layers overlaid the set of advertisement slots, each layer, in the set of layers, arranged over a particular video advertisement, in the set of video advertisements, and configured to trigger reconfiguration of the image player responsive to selection by the user. In one example, each layer can be transparent, such that the video advertisement and/or a first frame of the video advertisement is viewable to the user. Alternatively, in another example, each layer can define an opacity level (e.g., configured to conceal the video advertisement) and include a static image (e.g., a logo, a frame of the video advertisement) associated with the video advertisement.

In this example, in response to the user hovering her cursor over a first layer, in the set of layers, corresponding to a first video advertisement loaded in a first advertisement slot, the ad platform can expand an area of the first advertisement slot, such that frames of the video advertisement—spanning the area of the first advertisement slot—also expand. The ad platform can then trigger playback of the first video advertisement within the first advertisement slot.

In another implementation, the ad platform can render an image player, located in a first subregion of the home screen, defining a 3D polyhedron (e.g., a pyramid, a cube, an octahedron) including a set of faces (or "tiles"), such that each video advertisement, in the set of video advertisements, included in this instance of the ad stream, defines a face, in the set of faces, of the polyhedron.

For example, in response to a first pause event, the ad stream can render the home screen over a paused frame of the primary content stream. The home screen can include a set of icons (e.g., controls) corresponding to a set of video advertisements and configured to receive user inputs, and an image player in a first subregion of the home screen, the image player defining a 3D cube having six tiles, each tile of the cube configured to render advertising content (e.g., static images, videos) corresponding to the set of video advertisements available to the user for viewing within the ad stream. In this example, the cube can be configured such that a first tile of the cube renders a first video advertisement in the set of video advertisements, a second tile of the cube renders a second video advertisement in the set of video advertisements, a third tile of the cube renders a third video advertisement in the set of video advertisements, and so on. Further, the cube can be animated (e.g., moving, rotating, rolling) according to a responsive transformation, such that each tile of the cube may be viewed by the user. Then, in response to the user locating a pointer over a first icon corresponding to the first video advertisement, the ad platform can reconfigure the image player according to a second subregion of the home screen, such that the image player defines an expanded window of one tile corresponding to the first video advertisement. The ad platform can then initiate playback of the first video advertisement within this expanded window with frames of the first video advertisement matched to a size of the expanded window.

In yet another implementation, the ad stream can render an image player, located in a first subregion of the home screen, a single frame loaded with a video advertisement and a static image including advertising content related to the video advertisement. In this implementation, the ad stream can be configured to: initially render the static image (i.e., an icon configured to receive user inputs) within the image player in response to a user-initiated event (e.g., a pause event) that triggers rendering of the ad stream on a display of a streaming device (e.g., smart TV, desktop computer, mobile device) accessed by the user; and trigger playback of the video advertisement within the image player—in replacement of the static image—in response to detection of a user input proximal and/or over the static image.

In one variation, the ad stream can be configured to present the image player in a particular format based on a type of streaming device accessed by the user viewing the ad stream. For example, the ad stream can be configured to: present the image player in a 3D cube format on the user's smart TV; present the image player in a rotating carousel format on the user's mobile device; and present the image player in a single frame format on the user's desktop computer. Additionally and/or alternatively, in another variation, the ad stream can be configured to selectively present the image player to the user in different formats, based on historical interactions between the user and the image player.

3.2 User Feedback Controls

In one implementation, the ad platform can render additional icons configured to increase user control over presentation and/or viewing of advertising content within the ad stream. In particular, the ad platform can render a set of feedback controls (e.g., icons, buttons) configured to receive user inputs and/or trigger changes to advertising content rendered within the image player, such as termination, pausing, skipping, or storing (e.g., for a later time) of playback of a particular video advertisement.

For example, the ad platform can render a set of feedback controls including: a first feedback control labelled "Save for Later"; a second feedback control labelled "Skip this video advertisement"; and/or a third feedback control labelled "Do not show this advertisement again". In this example, in response to user selection of the first feedback control labelled "Save for Later" during playback of a first video advertisement, the ad platform can: terminate playback of the first video advertisement and/or replace the first video advertisement with a second video advertisement in the image player; and store the first video advertisement in a local database, flagged for serving to the user during a subsequent instance of the ad stream (e.g., within a threshold duration). Alternatively, in this example, in response to user selection of the second feedback control labelled "Skip this video advertisement" during playback of the first video advertisement, the ad platform can: terminate playback of the first video advertisement and/or replace the first video advertisement with a second video advertisement in the image player; remove the first video advertisement from the local database; and, at a subsequent instance of the ad stream viewed by the user, serve the user a third video advertisement—distinct and related to (e.g., within the same advertising campaign) the first video advertisement—in the image player in the ad stream. Alternatively, in this example, in response to user selection of the third feedback control labelled "Do not show this advertisement again" during playback of the first video advertisement, the ad platform can: terminate playback of the first video advertisement and/or replace the first video advertisement with a second video advertisement (e.g., in a different advertising campaign) in the image player; remove the first video advertisement from the local database; and, at a subsequent instance of the ad stream viewed by the user, serve the user a third video advertisement—distinct and unrelated to (e.g., in a different advertising campaign and/or associated with a different brand) the first video advertisement—in the image player in the ad stream.

3.3 Exiting the Ad Stream

The ad platform can exit the ad stream and return to the primary content stream responsive to inputs from the user. In one implementation, the ad stream enables immediate return to the primary content stream responsive to a particular input by the user, such as responsive to the user clicking on a particular icon corresponding to the primary content stream and rendered over the ad stream or clicking the "play" button on the television remote twice consecutively. For example, at a first time, in response to receiving a selection of an episode of a television show by a user at her streaming device (e.g., the user's smart TV), the ad platform can render a first frame of a primary content stream corresponding to the episode selected by the user and initiate playback of the primary content stream from the first frame. Then, at a second time, in response to the user pausing the primary content stream at a second frame succeeding the first frame in the primary content stream, the ad platform can serve the ad stream to the user in replacement of the primary content stream. Upon receiving a selection of a first video advertisement from the user at the streaming device (e.g., the user's Smart TV), the ad platform can initiate playback of the first video advertisement. Then, at a second time, in response to receiving an input from the user indicating the user wishes to return to the primary content stream, the ad platform can: pause playback of the first video ad; exit the ad stream; render the second frame in the primary content stream; and initiate playback of the primary content stream from the second frame. Therefore, the ad platform enables the user to control switching between playback of the primary content stream and the ad stream, thus enabling the user to continue viewing advertising content in the ad stream when the user is engaged in this content and to switch back to viewing the primary content stream (e.g., the user's selected TV episode) when the user is less engaged or wishes to switch back to her selected content.

In one variation, the ad platform exits the ad stream and returns to the primary content stream responsive to an input from the user, upon completion of playback of a video advertisement (e.g., from a first frame in the video advertisement to a last frame in the video ad). In this variation, the ad platform can automatically exit the ad stream upon completion of playback of the video advertisement and render a particular (paused) frame of the primary content stream corresponding to the last frame of the primary content stream viewed by the user (e.g., before switching to the ad stream). Alternatively, the ad platform can return to the video advertisement home screen upon completion of playback of the video advertisement.

3.4 Switching Between Primary Content Stream & Ad Stream

In one implementation, the ad platform can intermittently render the ad stream over or in replacement of the primary content stream throughout a duration of the content stream, such as in response to pause events initiated by the user and/or in response to scheduled ad breaks within the primary content stream.

In one variation, the ad platform can automatically continue playback of a video advertisement selected by the user across multiple ad stream segments. For example, in response to a first pause event, the ad platform can serve the user a first ad stream segment in replacement of a first primary content stream segment. During the first ad stream segment, the ad platform can render the home screen of the video advertisement stream to the user and initiate playback of a first video advertisement from a first frame in the first video advertisement responsive to a selection input by the user at the home screen. Then, in response to the user selecting playback of the primary content stream, the ad platform can: pause playback of the first video advertisement at a second frame in the first video advertisement succeeding the first frame; terminate the first ad stream segment; and initiate playback of a second primary content stream segment. Then, at a later time, in response to a second pause event, the ad platform can serve the user a second ad stream segment in replacement of the second primary content stream segment. During the second ad stream segment, the ad platform can automatically load the second frame of the first video advertisement into the image player and initiate playback of the first video advertisement from the second frame. The ad platform can also enable the user to return to the ad stream home screen to select a different video advertisement, such as by rendering an icon configured to receive a user input and linked to the home screen. Therefore, the ad platform can continue playback of the same video advertisement across multiple ad stream segments based on the user's initial selection, thus tailoring ad content to the user's interests and increasing the likelihood of achieving a target outcome (e.g., brand lift, video completion, conversion) for this user with this video advertisement, while minimizing inconvenience or effort required by the user.

In another variation, in response to a second pause event, the ad platform can enable the user to select between continuing playback of the first video advertisement selected by the user during the first pause event or selecting a new video advertisement. Alternatively, the ad platform can automatically render the home screen, in response to each pause event, at the start of each ad stream segment.

4. Secondary Device

In one variation, the ad platform can enable the user to view the ad stream on multiple streaming devices. The ad platform can render a QR code on a display of the user's streaming device on the home screen of the ad stream, during playback of video advertisements in the ad stream, and/or during playback of the primary content stream such that the user may access the ad stream on a secondary device (e.g., her smartphone) by capturing an image of the QR code on the secondary device.

For example, the user can open a native application of a streaming platform on her smart TV (e.g., via her TV remote) and select a movie for viewing with her partner at home. Upon receiving her selection, the streaming platform can render a first frame of the primary content stream on a display of her Smart TV and initiate playback of the primary content stream from the first frame. After a first duration, the user may pause playback of the primary content stream at a second frame succeeding the first frame while her partner goes to the kitchen to make a snack. Upon detecting this "pause" event, the ad platform can overlay the second frame of the primary content stream with the home screen of the ad stream. Then, upon receiving a selection of a first video advertisement for backpacking gear from a sporting goods retailer, the ad platform can initiate playback of the first video advertisement from a first frame in the video advertisement. The ad platform can also render a QR code on the Smart TV display (e.g., overlaid a portion of the video advertisement, on a side of the video ad) linked to this ad stream. When the user's partner returns from the kitchen to continue viewing the movie, she may wish to continue viewing the first video advertisement to see a particular deal or gain additional insight regarding the backpacking gear advertised. The user may take a photo of (or aim a camera at) the QR code rendered on the Smart TV display with a camera built into her mobile device if she wishes to continue viewing the first video advertisement on her mobile device. Then, in response to an input entered by the user, the ad platform can pause playback of the first video advertisement at a second frame succeeding the first frame in the first video advertisement, render the second frame of the primary content stream on the display, and resume playback of the primary content stream. In response to the user taking a photo of (or aiming her camera at) the QR code, her mobile phone may prompt the user to (or automatically) open a particular website or native application (e.g., a native application associated with the ad platform, the native application of the streaming platform) configured to continue playback of the ad stream. Once the user opens this website or native application, the ad platform can continue playback of the first video advertisement from the second frame of the first video advertisement. The ad platform can enable the user to access the home screen of the ad stream during playback of the first video advertisement and enable selection of other video advertisements from the home screen on her mobile device.

Additionally and/or alternatively, the ad platform can enable the user to select an icon (e.g., the QR code, an image) configured to open a website or native application linked to the ad stream. For example, a user viewing streaming content on her laptop or smartphone may click on an icon configured to open a webpage at which the user may purchase a product advertised to the user in the ad stream.

5. Scheduled Video Advertisement Segments

In one variation, the ad platform can serve to the user scheduled video advertisement segments throughout a content stream in addition to serving to the user the interactive ad stream during "pause" events. The ad platform can segment the primary content stream into discrete segments and insert these scheduled video advertisement segments between segments of the primary content stream to generate a content stream.

For example, for a primary content stream exhibiting a duration of twenty-four minutes, the ad platform can segment the primary content stream into four discrete primary content segments including: a first primary content segment exhibiting a first duration of ten minutes; a second primary content segment exhibiting a second duration of five minutes; a third primary content segment exhibiting a third duration of five minutes; and a fourth primary content segment exhibiting a fourth duration of four minutes. The ad platform can then inject scheduled video advertisement segments between each primary content segment to generate a continuous content stream exhibiting a total duration of 30 minutes, including twenty-four minutes of the primary content stream and six minutes of scheduled video advertisement segments.

However, in one variation, the ad platform can adjust a duration of the scheduled video advertisement segments based on a duration of time the user spends viewing and/or interacting with the ad stream. In this variation, during pause events (e.g., while the ad stream is rendered on the display), the ad platform can track a set of ad stream metrics such as: a duration spent within the ad stream (or a duration of the pause event); a duration spent viewing playback of a particular ad; a number of video advertisements viewed by the user; which video advertisements the user selected and/or viewed; a completion rate for each video advertisement viewed (e.g., percentage of a video advertisement the user completed before exiting the video ad); etc. The ad platform can then access these ad stream metrics to adjust distribution and/or durations of scheduled video advertisement segments.

For example, the ad platform can initially schedule three scheduled video advertisement segments within a content stream, each scheduled video advertisement segment exhibiting a duration of 90 seconds, such that the content stream includes four discrete primary content segments, each separated by a 90-second scheduled video advertisement segment. However, if the user pauses the primary content stream during the third primary content segment (after viewing the first and second scheduled video advertisement segment), then the ad platform can serve to the user the ad stream in replacement of the primary content stream during this pause event. Upon serving to the user the ad stream, the ad platform can initiate a timer to track a duration of this pause event. During the pause event, the user may preview video advertisements within the ad stream and/or select video advertisements she wishes to view to initiate playback of these video advertisements. Then, when the user is ready to return to the primary content stream, she may select the primary content stream (e.g., by pressing the "play" button on her TV remote, by selecting a particular icon rendered on the display and linked to the primary content stream). Responsive to the user selection, the ad platform can: stop the timer and record the duration of the pause event; exit the ad stream; and continue playback of the third segment of the primary content stream. Then, upon completing playback of the third segment of the primary content stream, the ad platform can: access the recorded duration (e.g., two minutes) of the pause event; access a duration of the third scheduled video advertisement segment (e.g., 90 seconds); and, in response to recorded duration of the pause event exceeding the duration of the third scheduled video advertisement segment, skip the third scheduled video advertisement segment and initiate playback of the fourth segment of the primary content stream. Alternatively, the ad platform can reduce the duration of the third scheduled video advertisement segment (e.g., from 90 seconds to 30 seconds) based on the recorded duration of the pause event.

In one variation, the ad platform can update the content (or video advertisements) served to the user during scheduled video advertisement segments based on user selections and/or interactions with advertising content in the ad stream. For example, for a particular content stream, the ad platform can initially schedule a scheduled video advertisement segment including a placeholder video advertisement related to a car brand after a first primary content segment. During playback of the first primary content segment, in response to a pause event, the ad platform can serve the ad stream to the user in replacement of the primary content stream, including a selection between a first video advertisement related to sporting goods and a second video advertisement related to a car brand. In response to selection of the first video advertisement related to sporting goods, the ad platform can initiate playback of the first video advertisement. Then, in response to termination of the pause event by the user, the ad platform can pause playback of the first video advertisement and serve the user the primary content stream in replacement of the ad stream. Then, upon completion of playback of the first primary content segment, the ad platform can resume playback of the first video advertisement during the first scheduled video advertisement segment in replacement of the placeholder video advertisement related to the car brand. Alternatively, the ad platform can select a new video advertisement to serve to the user during this scheduled video advertisement segment that better fits the user's interests as indicated by the selection of the first video advertisement related to sporting goods and/or by the user's historical selections and/or interactions with video advertisements in the ad stream.

Therefore, by serving an interactive ad stream to the user responsive to user inputs (e.g., pause events) in combination with scheduled video advertisement segments automatically included in the content stream, the ad platform can tailor content included in these scheduled video advertisement segments to better fit the user's interests and thus increase the likelihood of achieving a particular advertising outcome (e.g., brand lift, conversion). The ad platform can also reduce a duration and/or quantity of scheduled video advertisements interrupting the content stream by enabling the user to select and view video advertisements during user-initiated breaks (e.g., pause events), thus decreasing inconvenience to the user and increasing a likelihood of user engagement with advertising content included in the video advertisements.

6. Engagement

The image player (or the ad platform, etc.) can track user interactions with advertising content presented to the user in the image player. In particular, the image player can: collect engagement data (e.g., clicks, scrolls, swipes, viewability, video completion) related to interactions between the ad stream and/or a particular video advertisement and a user viewing the ad stream on a streaming device; and package these engagement data into one or more metrics indicative of user engagement with the ad stream. For example, the image player can track user interactions with a video advertisement to characterize user engagement with the video advertisement based on: a quantity of inputs (e.g., clicks, swipes, locating of a cursor) over an icon linked to the video advertisement; a proportion of the video advertisement viewed by the user; a quantity of replays of the video advertisement; a quantity of user inputs (e.g., clicks, swipes, tilts, gestures) entered by the user in the ad stream; a maximum advertisement tier viewed by the user; a duration of time the user spent interacting with the video advertisement; whether an audio stream was played during playback of the video advertisement; whether the user scanned a QR code rendered on the display during playback of the video advertisement; etc.

6.1 Engagement Metrics

The image player and/or the ad platform can characterize an engagement level (or "engagement score") of a user with a particular video advertisement. In particular, the image player can record and quantify an extent to which the user engaged with the particular video advertisement—such as at each advertisement tier—and leverage these insights to inform selection of future video advertisements and/or other advertising content to serve to this user in order to increase a likelihood of achieving a target outcome (e.g., brand lift, conversion, viewability, VCR) associated with this advertising content.

In one implementation, the ad platform can: track a first set of user interactions corresponding to a first advertisement tier automatically rendered on the home screen responsive to initiation of a pause event by the user; track a second set of user interactions corresponding to a second advertisement tier corresponding to playback of a particular video advertisement in the image player responsive to selection of a corresponding icon by the user; track a third set of user interactions corresponding to a third advertisement tier corresponding to expansion of the image player—and expansion of frames of the video advertisement—and initiation of an audio feed corresponding to the video advertisement; and/or track a fourth set of user interactions corresponding to a fourth advertisement tier corresponding to rendering of a webpage or application on a secondary device accessed by the user responsive to selection by the user. The ad platform can then characterize engagement of the user with advertising content in the video advertisement at each advertisement tier individually and/or overall.

For example, the ad platform can characterize engagement of the user at the first advertisement tier based on: a quantity of inputs over the set of icons presented on the home screen; a quantity of swipes and/or navigations between icons, in the set of icons, at the first advertisement tier; whether the user selects an icon to initiate playback of a video advertisement; and/or a duration that the image player is rendered on the home screen prior to selection of an icon by the user. The ad platform can characterize engagement of the user at the second advertisement tier based on: a duration that playback of the video advertisement is rendered on the home screen; a video completion rate of the video advertisement; whether the user switches playback to a different video advertisement; and/or whether the user initiates the corresponding audio feed and/or expansion of the video advertisement. The ad platform can then characterize engagement of the user at the third advertisement tier based on: a duration that playback of the video advertisement is rendered on the home screen at the third advertisement tier; a video completion rate of the video advertisement at the third advertisement tier; whether the user switches playback to a different video advertisement; whether the user terminates playback of the video advertisement and/or terminates the audio feed; and/or whether the user engages with additional advertising content—such as via scanning of a QR code on the home screen with her mobile device—outside of the ad stream. Finally, the ad platform can characterize engagement of the user at the fourth advertisement tier based on: whether the user completes a purchase related to the video advertisement; and/or a duration of time the user spends viewing a website, webpage, or advertising content related to the video advertisement.

In another implementation, the image player can track a first type of user interactions related to interactions with the set of icons and a second type of user interactions related to interactions with the set of video advertisements. In this implementation, the image player can leverage this interaction data to inform future video advertisements served to this user and/or to update the video advertisement in real-time to increase user engagement with the video advertisement.

For example, for a video advertisement loaded in an image player located on the home screen of the ad stream rendered by a streaming device accessed by a user, the image player can track a quantity of selections of an icon—linked to the video advertisement—rendered on the home screen to characterize a first engagement score (e.g., level or degree of engagement) for the user interacting with the video advertisement and/or a brand (e.g., a brand associated with the icon) associated with the video advertisement. Additionally, the image player can track a video completion rate for the user viewing the video advertisement to characterize a second engagement score for the user interacting with the video advertisement. In this example, if the first engagement score is relatively high and the second engagement score is relatively low—indicating the user is highly engaged with the brand associated with the video advertisement but less engaged with content included in the video advertisement, the image player can update the video advertisement associated with this icon—such as by replacing the initial video advertisement with a new video advertisement in the same advertising campaign—in (near) real-time or prior to a next pause event in order to increase engagement of the user with the brand and/or advertising campaign.

6.1.2 Engagement: User Feedback Controls

As described above, the ad platform can render a set of feedback controls (e.g., icons, buttons) configured to receive user inputs and/or trigger changes to advertising content rendered within the image player. The ad platform can also leverage selection of these user feedback controls to extract insights regarding user engagement with advertising content presented in the image player and therefore leverage these insights to inform presentation of future video advertisements to the user.

For example, the ad platform can render a set of feedback controls (e.g., adjacent the image player) including: a first feedback control labelled "Save for Later"; and a second feedback control labelled "Skip this Advertisement." In response to the user selecting the first feedback control (e.g., "save for later") during playback of a first video advertisement, the ad platform can characterize the user's engagement with the first video advertisement as moderate based on the user exhibiting at least a threshold level of interest in viewing the first advertisement at a later time. However, in response to the user selecting the second feedback control (e.g., "skip this advertisement") during playback of the first video advertisement, the ad platform can characterize the user's engagement with the first video advertisement as low based on the user exhibiting minimal interest in viewing the first video advertisement.

6.2 Cross-Platform Engagement Metrics

The ad platform can leverage user interactions with the ad stream across multiple devices (e.g., streaming devices and/or computing devices)—such as at the user's smart TV, desktop computer, and/or mobile device—to link these devices to this particular user and therefore link engagement data collected at each of these devices to this particular user. The ad platform can then compile these segregated engagement data—collected at each of these devices accessed by the user—into a singular corpus of engagement data representative of the user's interactions with advertising content across multiple devices accessed by and/or associated with this particular user. The ad platform can then leverage this corpus of engagement data to selectively serve advertising content within the ad stream to the user.

For example, during a first pause event, the ad platform can render a home screen—including an image player loaded with a set of video advertisements and a set of icons selectable by the user—of the ad stream viewed on the display of a streaming device accessed by the user. Then, in response to detecting a first user input proximal a first icon in the set of icons, the ad platform can: reconfigure the image player to a second subregion of the home screen; trigger playback of a first video advertisement, in the set of video advertisements, corresponding to the first icon, within the image player; and render a first identifier (e.g., a QR code, a password, a hyperlink) associated with the first video advertisement and the streaming device on the home screen. Then, in response to the user entering the identifier on her mobile device (e.g., capturing the QR code with a camera on her mobile device)—distinct from the streaming device— the ad platform can: link the mobile device to the streaming device via the first identifier; and trigger navigation to a webpage associated with the first video advertisement within a web browser executing on the user's mobile device. Additionally and/or alternatively, in this example, the ad platform can trigger navigation to a native application (e.g., associated with the ad platform, associated with the streaming platform) configured to continue playback of the first video advertisement and/or render advertising content related to the first video advertisement.

The ad platform can then: track user interactions with the webpage and/or native application to extract engagement metrics related to content of the first video advertisement; and leverage these engagement metrics—in combination with engagement metrics extracted from recorded user interactions with the first video advertisement at the streaming device—to inform future serving of the first video advertisement, other video advertisements in the same advertising campaign (e.g., associated with the same brand), and/or video advertisements in different advertising campaigns (e.g., associated with the same or different brands).

Further, the ad platform can: access historical engagement data recorded at the mobile device representing historical user interactions with a wide range of advertising content previously presented to the user at the mobile device; access historical engagement data recorded at the streaming device representing historical user interactions with a wide range of advertising content previously presented to the user within the ad stream at the streaming device; and similarly leverage this corpus of historical engagement data to inform presentation of future video advertisement to this user within the ad stream.

In one implementation, the ad platform can leverage identification of devices linked to a particular user to inform presentation of a particular advertisement and/or advertising campaign to the user across multiple devices. For example, the ad platform can: track a total time spent viewing a particular video advertisement for the user based on a first time spent viewing this video advertisement on a first streaming device and second time spent viewing this video advertisement on a second streaming device linked to the first streaming device. In response to this total time spent exceeding a threshold time spent defined for the video advertisement, the ad platform can select a next video advertisement, in the same advertising campaign, for presenting to the user within the ad stream.

7. Variation: Ad Stream "Events"

As described above, the ad platform—in combination with a streaming platform—can serve an interactive ad stream during an event (e.g., a "pause" event) initiated by the user while viewing streaming content on a streaming device, such as during pauses or breaks in a primary content stream. Blocks of the method S100 are described above as executed during and/or responsive to "pause" events (e.g., scheduled and/or user-initiated pause events). However, the ad platform—in combination with the streaming platform— can be configured to serve an ad stream during any other type of "event" at the streaming device, such as: a "device start-up" event initiated by the user navigating to a home screen of her streaming device; and/or a "streaming start-up" event initiated by the user navigating to a home screen of a particular streaming service.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
during a first pause event that pauses playback of a primary content stream at a first frame of a digital video in the primary content stream, the primary content stream viewed on a display of a primary device accessed by a user, rendering a home screen of an ad stream in replacement of the primary content stream, the home screen comprising an image player:
located in a first subregion, in a set of subregions, of the home screen; and
comprising a set of icons selectable by the user, each icon, in the set of icons, corresponding to a video advertisement in a set of video advertisements;
during the first pause event, in response to a first user input proximal a first icon in the set of icons, corresponding to a first video advertisement in the set of video advertisements:
reconfiguring the image player to a second subregion of the home screen;
rendering a digital identifier adjacent the second subregion within the home screen, the digital identifier associated with the ad stream rendered on the primary device; and
triggering playback of the first video advertisement within the image player; and
during playback of the first video advertisement within the image player:

in response to a scan event that captures the digital identifier at a secondary device accessed by the user:
triggering the secondary device to navigate to an electronic document comprising content associated with the first video advertisement;
associating the secondary device with the primary device based on the digital identifier; and
characterizing engagement of the user with the first video advertisement based on the scan event.

2. The method of claim 1, wherein characterizing engagement of the user with the first video advertisement based on the scan event comprises:
characterizing a first engagement score, in a set of engagement scores, for the user interacting with the first video advertisement based on user inputs at the first icon within the ad stream;
characterizing a second engagement score, in the set of engagement scores, for the user interacting with the first video advertisement based on the scan event; and
storing the set of engagement scores in a device profile associated with the primary device.

3. The method of claim 2:
wherein reconfiguring the image player to the second subregion of the home screen in response to the first user input proximal the first icon comprises reconfiguring the image player to the second subregion of the home screen in response to the first user input proximal the first icon located in a first icon position, in a set of icon positions, within the home screen;
wherein characterizing the first engagement score for the user interacting with the first video advertisement based on the first user input comprises:
accessing a first weight assigned to user inputs proximal the first icon position; and
characterizing the first engagement score for the user interacting with the first video advertisement based on the first user input and the first weight; and
further comprising, in response to a third user input proximal a second icon, in the set of icons, located in a second icon position in the set of icon positions:
reconfiguring the image player to the second subregion of the home screen;
initiating playback of a second video advertisement, in the set of video advertisements, linked to the second icon, from a first frame in the second video advertisement to a second frame succeeding the first frame in the second video advertisement within the image player;
accessing a second weight assigned to user inputs proximal the second icon position, the second weight exceeding the first weight; and
characterizing a third engagement score for the user interacting with the second video advertisement based on the third user input and the second weight.

4. The method of claim 1:
wherein rendering the home screen comprising the image player comprises rendering the home screen comprising the image player defining a three-dimensional polyhedron and comprising a set of faces, each video advertisement, in the set of video advertisements, defining a face, in the set of faces; and
wherein reconfiguring the image player to the second subregion of the home screen in response to the first user input proximal the first icon comprises reconfiguring the image player to the second subregion of the home screen in response to the first user input proximal the first icon, the image player defining an expanded window of a first face, in the set of faces, corresponding to the first video advertisement, in the second subregion.

5. The method of claim 1:
wherein rendering the home screen of the ad stream during the first pause event that pauses playback of the primary content stream viewed on the display of the primary device accessed by the user comprises rendering the home screen of the ad stream during the first pause event that pauses playback of the primary content stream viewed on the display of a streaming television accessed by the user; and
wherein triggering the secondary device to navigate to the electronic document comprising content associated with the first video advertisement in response to the scan event that captures the digital identifier at the secondary device comprises triggering the secondary device, comprising a mobile device accessed by the user, to navigate to the electronic document comprising content associated with the first video advertisement in response to the scan event that captures the digital identifier at the mobile device.

6. The method of claim 1, further comprising:
linking the primary device to the mobile device based on the digital identifier;
accessing a first set of engagement data representing user interactions with the first video advertisement at the primary device;
accessing a second set of engagement data representing user interactions with the first video advertisement at the secondary device; and
characterizing user engagement with the first video advertisement based on the first set of engagement data and the second set of engagement data.

7. The method of claim 1, further comprising:
in response to termination of the first pause event during playback of the first video advertisement at a first frame:
pausing playback of the first video advertisement at the first frame;
terminating the ad stream; and
initiating playback of the primary content stream; and
during a second pause event, succeeding the first pause event, that pauses playback of the primary content stream:
rendering the home screen of the ad stream in replacement of the primary content stream, the home screen comprising the image player located in the second subregion of the home screen; and
triggering playback of the first advertisement from the first frame in the first video advertisement within the image player.

8. The method of claim 1, further comprising, in response to a second user input proximal the first icon:
expanding the image player across the home screen;
activating an audio stream of the first video advertisement; and
continuing playback of the first video advertisement within the image player.

9. The method of claim 1, wherein triggering the secondary device to navigate to the electronic document comprising content associated with the first video advertisement comprises:
triggering the secondary device to navigate to the electronic document comprising a second image player loaded with the first video advertisement playback of the video advertisement; and triggering playback of the first video advertisement within the second image player at the secondary device.

10. The method of claim 1:
wherein associating the secondary device with the primary device based on the digital identifier in response to the scan event that captures the digital identifier at the secondary device comprises, in response to the scan event that captures the digital identifier at the secondary device:
  receiving a request for content from the secondary device, the request specifying the digital identifier associated with the primary device and a device identifier associated with the secondary device; and
  linking the device identifier to a device profile, in a population of device profiles, associated with the primary device;
wherein characterizing engagement of the user with the first video advertisement based on the scan event comprises deriving a first engagement metric, representing engagement of the user with the first video advertisement, based on the scan event; and
further comprising, storing the first engagement metric in the device profile.

* * * * *